United States Patent
Manmatha et al.

(10) Patent No.: US 9,530,069 B2
(45) Date of Patent: *Dec. 27, 2016

(54) METHOD AND SYSTEM FOR DETECTING AND RECOGNIZING TEXT IN IMAGES

(71) Applicant: A9.com, Inc., Palo Alto, CA (US)

(72) Inventors: Raghavan Manmatha, Belchertown, MA (US); Mark A. Ruzon, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,279

(22) Filed: Feb. 3, 2015

(65) Prior Publication Data

US 2015/0154464 A1 Jun. 4, 2015

Related U.S. Application Data

(63) Continuation of application No. 13/713,776, filed on Dec. 13, 2012, now Pat. No. 8,977,072, which is a
(Continued)

(51) Int. Cl.
*G06K 9/34* (2006.01)
*G06K 9/32* (2006.01)
(Continued)

(52) U.S. Cl.
CPC ............. *G06K 9/344* (2013.01); *G06K 9/18* (2013.01); *G06K 9/325* (2013.01); *G06K 9/342* (2013.01);
(Continued)

(58) Field of Classification Search
None
See application file for complete search history.

(56) References Cited

U.S. PATENT DOCUMENTS 3,930,231 A * 12/1975 Henrichon, Jr. ......... G06K 9/32
382/205
3,992,697 A * 11/1976 Knab ....................... G06K 9/03
382/203

(Continued)

OTHER PUBLICATIONS

"TextFinder: An Automatic System to Detect and recognize Text in Images" by V. Wu, R. Manmatha, and E.M. Riseman, IEEE Transactions on Pattern Analysis and Machine Intelligence, vol. 21, No. 11, pp. 1224-1229 (Nov. 1999).

(Continued)

*Primary Examiner* — Michelle Entezari
(74) *Attorney, Agent, or Firm* — Hogan Lovells US LLP

(57) ABSTRACT

Various embodiments of the present invention relate to a method, system and computer program product for detecting and recognizing text in the images captured by cameras and scanners. First, a series of image-processing techniques is applied to detect text regions in the image. Subsequently, the detected text regions pass through different processing stages that reduce blurring and the negative effects of variable lighting. This results in the creation of multiple images that are versions of the same text region. Some of these multiple versions are sent to a character-recognition system. The resulting texts from each of the versions of the image sent to the character-recognition system are then combined to a single result, wherein the single result is detected text.

20 Claims, 13 Drawing Sheets

Related U.S. Application Data continuation of application No. 13/197,591, filed on Aug. 3, 2011, now Pat. No. 8,335,402, which is a continuation of application No. 12/284,283, filed on Sep. 19, 2008, now Pat. No. 8,009,928, which is a continuation of application No. 12/009,913, filed on Jan. 23, 2008, now abandoned.

(51) Int. Cl.
*G06K 9/62* (2006.01)
*G06K 9/38* (2006.01)
*G06K 9/40* (2006.01)
*G06K 9/18* (2006.01)
*G06K 9/74* (2006.01)

(52) U.S. Cl.
CPC .............. *G06K 9/346* (2013.01); *G06K 9/38* (2013.01); *G06K 9/40* (2013.01); *G06K 9/62* (2013.01); *G06K 9/6288* (2013.01); *G06K 9/748* (2013.01); *G06K 2209/01* (2013.01)

(56) References Cited

U.S. PATENT DOCUMENTS

| | | | |
|---|---|---|---|
| 4,034,341 A * | 7/1977 | Isono | B07C 3/14 209/584 |
| 4,066,998 A * | 1/1978 | Lidkea | G06K 9/4609 382/186 |
| 4,680,803 A * | 7/1987 | Dilella | G06K 9/342 382/140 |
| 5,065,437 A | 11/1991 | Bloomberg | |
| 5,131,049 A * | 7/1992 | Bloomberg | G06K 9/346 382/173 |
| 5,134,668 A | 7/1992 | Appel | |
| 5,201,011 A | 4/1993 | Bloomberg et al. | |
| 5,410,611 A | 4/1995 | Huttenlocher et al. | |
| 5,548,700 A | 8/1996 | Bagley et al. | |
| 5,768,412 A | 6/1998 | Mitsuyama et al. | |
| 5,790,696 A | 8/1998 | Takahashi | |
| 5,809,167 A | 9/1998 | Al-Hussein | |
| 5,841,903 A * | 11/1998 | Kikuchi | G06K 9/342 382/173 |
| 5,892,842 A | 4/1999 | Bloomberg | |
| 6,026,177 A | 2/2000 | Mong et al. | |
| 6,272,244 B1 | 8/2001 | Takahashi et al. | |
| 6,438,265 B1 | 8/2002 | Heilper et al. | |
| 6,563,939 B1 | 5/2003 | Chai | |
| 6,741,724 B1 | 5/2004 | Bruce et al. | |
| 6,865,290 B2 | 3/2005 | Kohchi | |
| 6,888,957 B1 | 5/2005 | Kim et al. | |
| 6,920,247 B1 | 7/2005 | Mayzlin et al. | |
| 6,968,085 B2 * | 11/2005 | Bern | G06K 9/342 382/218 |
| 7,164,797 B2 * | 1/2007 | Simard | G06K 9/00442 382/218 |
| 7,200,266 B2 | 4/2007 | Ozer et al. | |
| 7,272,245 B1 | 9/2007 | Layton | |
| 7,400,767 B2 * | 7/2008 | Slabaugh | G06K 9/6206 382/173 |
| 7,646,921 B2 | 1/2010 | Vincent et al. | |
| 7,650,041 B2 | 1/2010 | Madej et al. | |
| 7,873,215 B2 | 1/2011 | Xiao et al. | |
| 7,925,072 B2 | 4/2011 | Chen et al. | |
| 7,983,483 B2 | 7/2011 | Nankai et al. | |
| 8,009,928 B1 | 8/2011 | Manmatha et al. | |
| 8,068,684 B2 * | 11/2011 | Dauw | G06K 9/00456 358/426.01 |
| 8,335,402 B1 * | 12/2012 | Manmatha | G06K 9/325 382/173 |
| 8,977,072 B1 * | 3/2015 | Manmatha | G06K 9/325 382/173 |
| 2006/0013511 A1 | 1/2006 | De Champlain et al. | |
| 2007/0058856 A1 | 3/2007 | Boregowda et al. | |
| 2007/0104370 A1 | 5/2007 | Rosenbaum | |
| 2008/0101726 A1 | 5/2008 | Myers et al. | |
| 2009/0110194 A1 | 4/2009 | Athsani et al. | |
| 2009/0148043 A1 | 6/2009 | Ophir et al. | |

OTHER PUBLICATIONS

"Detecting and reading text in Natural Scenes" by X. Chen and A. Yuille, Proceedings of the 2004 IEEE Computer Science Conference on Computer Vision and Pattern Recognition, vol. 2, pp. 363-373 (2004).

"Non Final Office Action dated Jun. 4, 2010", received in U.S. Appl. No. 12/284,283.

"Final Office Action dated Oct. 10, 2010", received in U.S. Appl. No. 12/284,283.

"Notice of Allowance dated May 17, 2011", received in U.S. Appl. No. 12/284,283.

"Non Final Office Action dated Jul. 3, 2012", received in U.S. Appl. No. 13/197,591.

"Notice of Allowance dated Aug. 30, 2012", received in U.S. Appl. No. 13/197,591.

"Non Final Office Action dated Oct. 31, 2013", received in U.S. Appl. No. 13/713,776.

"Final Office Action dated Apr. 29, 2014", received in U.S. Appl. No. 13/713,776.

"Notice of Allowance dated Nov. 14, 2014", received in U.S. Appl. No. 13/713,776.

* cited by examiner

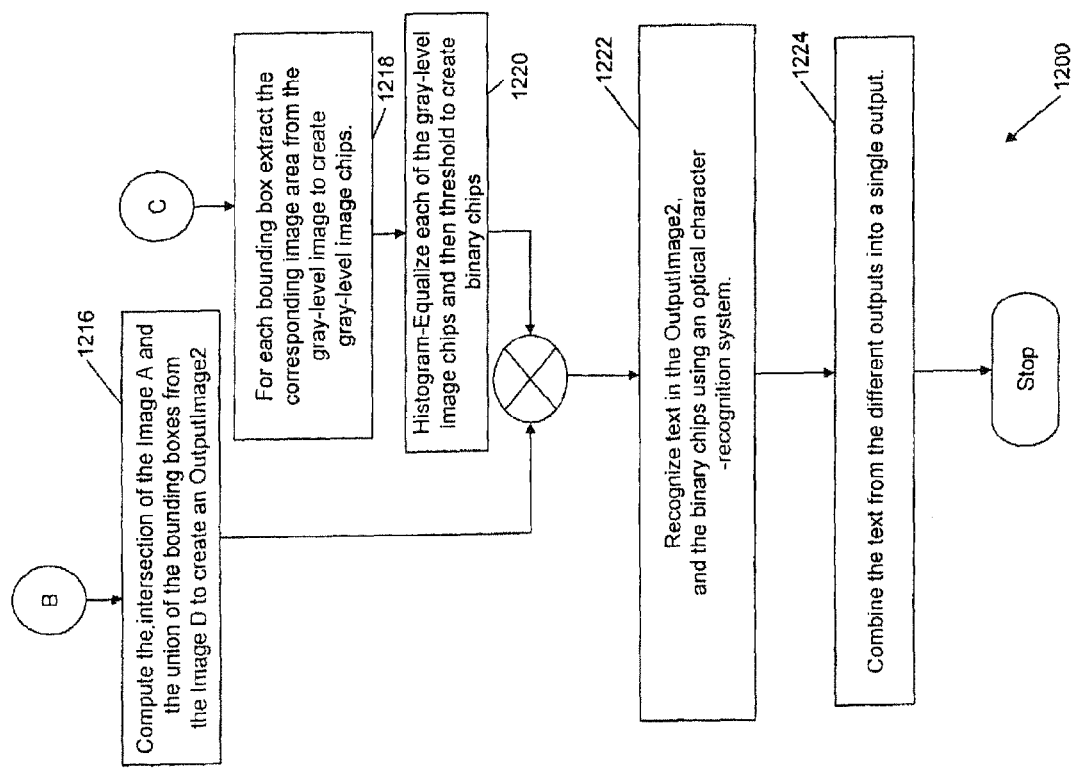

METHOD AND SYSTEM FOR DETECTING AND RECOGNIZING TEXT IN IMAGES

CROSS-REFERENCES TO RELATED APPLICATIONS

This application is a continuation of U.S. application Ser. No. 13/713,776, entitled "Method and System for Detecting and Recognizing Text in Images," filed Dec. 13, 2012, which is a continuation of U.S. application Ser. No. 13/197,591, entitled "Method and System for Detecting and Recognizing Text in Images," filed Aug. 3, 2011; now U.S. Pat. No. 8,335,402, which is a continuation of U.S. application Ser. No. 12/284,283, entitled "Method and System for Detecting and Recognizing Text in Images," filed Sep. 19, 2008, now U.S. Pat. No. 8,009,928; which is a continuation of abandoned U.S. application Ser. No. 12/009,913, entitled "Method and System for Detecting and Recognizing Text in Images," filed Jan. 23, 2008, of which the full disclosures of these applications are incorporated herein by reference for all purposes.

BACKGROUND OF THE INVENTION

The present invention involves a method and system for the detection and recognition of text in images. The quality of these images varies due to improper focus, motion blur, lighting variations or noise.

Printed text can be detected and recognized by using an optical character-recognition engine (OCR). The OCR technology that is currently used runs on images of clear text with modern fonts printed against clean backgrounds. In addition, the images are assumed to be created by a scanner at high resolution. The scanning process produces high quality sharp images of text under uniform illumination. This is also true when high resolution cameras are used for scanning under uniform illumination. However, commercial OCR and conventional OCR technologies do not work well when the fonts are unusual or when the text is printed against a non-uniform image background. Also, commercial OCR technology does not work well when the images are taken with hand-held cameras whose viewpoint is no longer fronto-parallel to the text and lighting changes or ambient illumination may affect the results. In a fronto-parallel view, a rectangle is imaged as a rectangle and the world and image rectangle have the same aspect ratio.

Images produced by cameras on mobile computational devices such as cell phones and personal digital assistants (PDAs) are often of poor quality because they have inexpensive optics, small apertures, slow shutters and in many cases fixed-focus lenses. Such cameras often show blur (both motion and focus blur) and noise.

Moreover, in situations where the lenses are close to the object, the depth of field is poor and the blur problem grows worse with the introduction of varying amounts of blur through the images produced by different lenses.

Illumination variations are an additional problem and cannot be rectified easily using the flash on cell phone cameras, since the flash on these devices is usually not strong enough and tends to create illumination variations. The OCR technology used currently often works poorly on the text in such images.

Some efforts have been made to detect text against the general image in the background and then extract and clean the text to create black text against a white background, which is then passed on to an OCR for text-detection. Examples of such efforts can be seen in Wu et al (V. Wu, R. Manmatha, and E. M. Riseman "TextFinder: An Automatic System to Detect and Recognize Text In Images," IEEE PAMI, vol. 21, no. 11, pp. 1224-1229, Nov. 1999) and more recently in Chen and Yuille (X. Chen and A. Yuille, "Detecting and Reading Text in Natural Scenes, CVPR 2004, vol. 2, pp. 366-373). The effort by Wu et al was designed mainly for scanned images, while the more recent work of Chen and Yuille was designed for street signs taken by high quality cameras. Neither of these is designed to rectify images of poor quality with problems like blur.

There is, therefore, a need for a method and system for detecting and extracting text in the images of varying quality produced by mobile computational devices such as cell phones and PDAs.

BRIEF SUMMARY OF THE INVENTION

An object of the present invention is to provide a method, system and computer program product for detecting and recognizing text in an image with lighting variations.

Another object of the present invention is to provide a method, system and computer program product for detecting and recognizing text in blurred images. These blurred images can be both focus and motion blurred.

Yet another object of the present invention is to provide a method, system and computer program product for detecting and recognizing text not only in images captured by camera phones but also in images from cameras and scanners.

Various embodiments of the present invention relate to a method, system and computer program product for detecting and recognizing text in the images captured by cameras and scanners. To begin with, a series of image-processing techniques is applied to detect text regions in the image captured by cameras and scanners. These images are blurred, noisy, or contain lighting variations. Subsequently, the detected text regions undergo different processing stages that reduce blurring and the negative effects of lighting variations. This results in the creation of multiple images that are versions of the same text region. Some of these multiple versions are sent to a character-recognition system. The resulting text from all of these images sent to the character-recognition system is then combined to a single text result.

BRIEF DESCRIPTION OF THE DRAWINGS

The embodiments of the present invention will hereinafter be described in conjunction with the appended drawings, provided to illustrate and not to limit the invention, wherein like designations denote like elements, and in which:

FIGS. 12A and 12B illustrate detailed steps for detecting and recognizing text in an image, in accordance with an embodiment of the present invention.

DETAILED DESCRIPTION OF THE INVENTION

Various embodiments of the present invention relate to a method, system and computer program product for detecting and recognizing text in images captured by camera phones and scanners. First, a series of image-processing techniques is applied to detect text regions in the image. Subsequently, the detected text regions pass through different processing stages to reduce blurring and other negative effects of variable lighting. Thus, multiple images including the processed image and the original image are obtained. Such images are used to create multiple versions of the same text region. Some of these multiple versions are sent to an optical character-recognition system. The resulting text from all of these images sent to the character-recognition system is then combined into a single text result.

Figure 1:
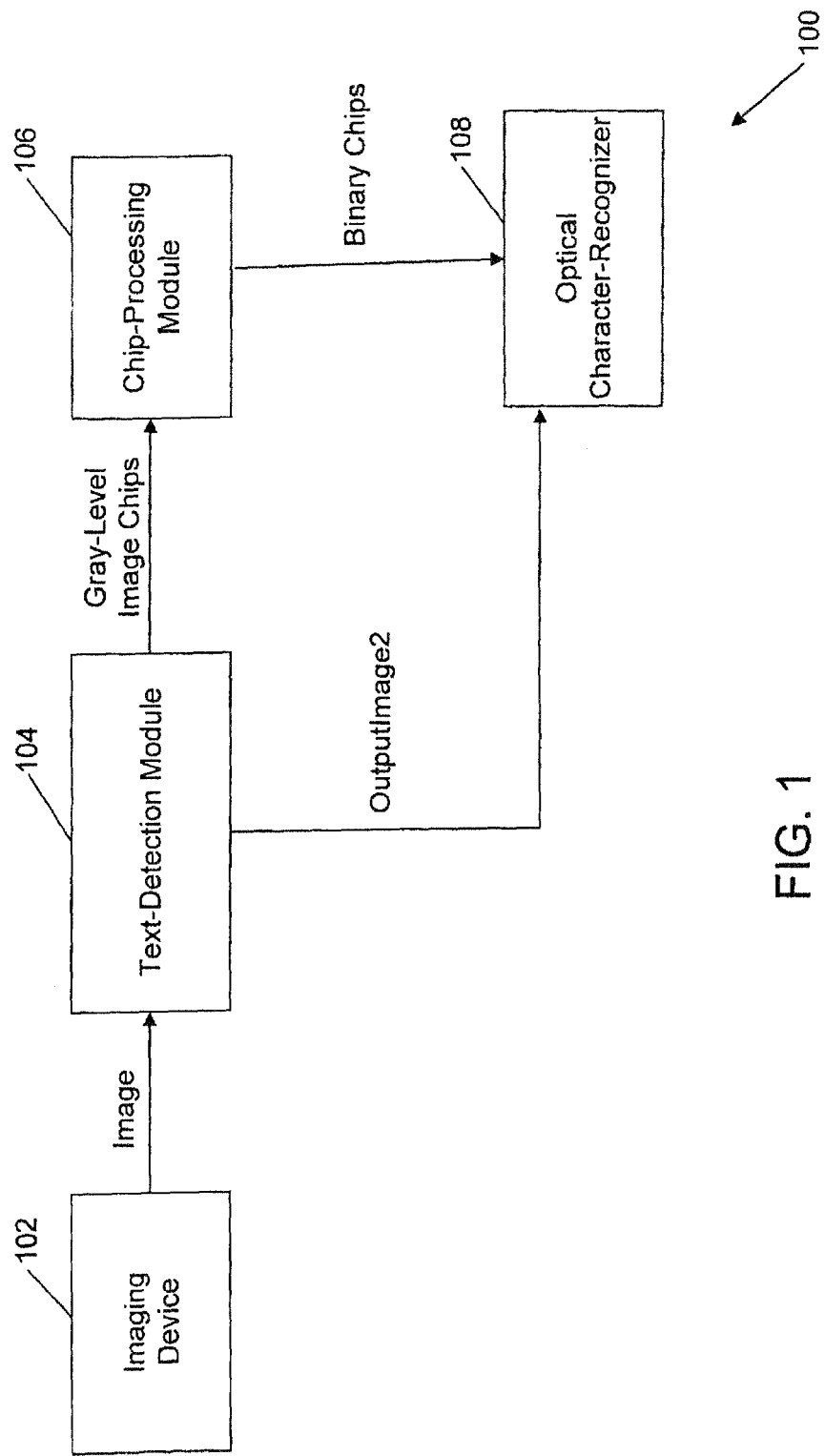
FIG. 1 is a block diagram illustrating a system for detecting and recognizing text in an image, in accordance with an embodiment of the present invention.

FIG. 1 is a block diagram illustrating a system 100 for detecting and recognizing text in an image, in accordance with an embodiment of the present invention. System 100 includes an imaging device 102, a text-detection module 104, a chip-processing module 106, and an optical character-recognizer module 108. The image may be captured by a camera phone or other mobile device, a digital camera or a scanner. The image may also be sent over a network by the imaging device 102. Imaging device 102 may include a scanner, a cell phone with a camera or a hand-held computational device with a camera. The quality of the image depends on the imaging device 102. Some imaging devices such as cell phones with cameras may produce images that are noisy, blurred, and contain intensity variations. Text-detection module 104 is explained in detail in conjunction with FIG. 2, while chip-processing module 106 is explained in detail in conjunction with FIG. 8.

Figure 2:
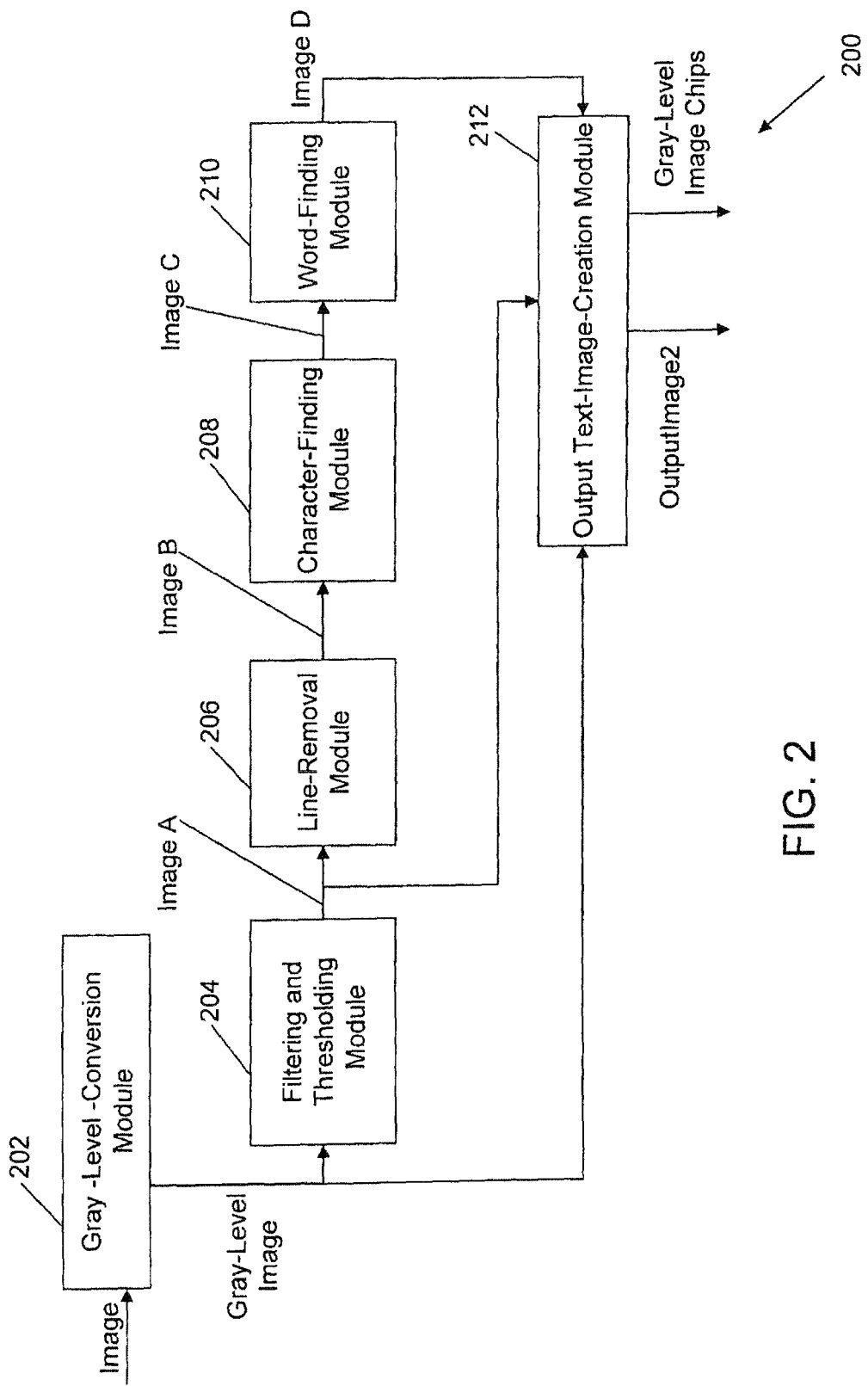
FIG. 2 is a block diagram illustrating a text-detection module along with its elements, in accordance with another embodiment of the present invention.

FIG. 2 is a block diagram illustrating text-detection module 104 along with its elements, in accordance with an embodiment of the present invention. The text-detection system 200 detects text regions in the image even in the presence of noise, blur or lighting variations. A gray-level conversion module 202 converts the image to a gray level version of the image to form a gray-level image. The gray-level image is composed of shades of gray, varying from black at the weakest intensity to white at the strongest. A filtering and thresholding module 204 then applies filters to the gray-level image to produce a filtered gray-level image, and the filtered gray-level image is then thresholded to produce an Image A. Thresholding is a method of image segmentation. For example if the intensity value of an individual pixel in a grayscale image is greater than a threshold value, the individual pixel in the grayscale image is marked as an "object" pixel. On the other hand, if the intensity value of the individual pixel in a grayscale image is less than or equal to the threshold value, the individual pixel is marked as a "background" pixel. Typically, an object pixel is given a value of "1" while a background pixel is given a value of "0." In the present case, intensity of each of the pixels of the filtered image is compared to a predefined threshold value, and a predefined intensity value is assigned to the pixel based on the comparison. The predefined threshold value can be either fixed or adjusted dynamically at the time of the comparison. The filters and threshold are chosen to emphasize line-like and bar-like regions which potentially correspond to text in the gray-level image. Examples of such line-like and bar-like regions include text, lines, boxes and intersecting line segments. Subsequently, long straight lines and rectangles are removed from the Image A using a line-removal module 206 to form an image B. Also, this module removes intersecting lines and boxes. The removal of intersecting lines and boxes is based on the idea that the long straight lines, rectangles, and intersecting lines and boxes do not correspond to text. The Image B contains text but may also contain small noisy segments and short lines. A character-finding module 208 is then used to identify potential text regions in the Image B. This is performed on the basis of predefined character constraints. The predefined character constraints are based on the properties of neighboring text. It is assumed that the neighboring text characters share certain properties; the spacing between such characters is roughly constant, and they are approximately aligned vertically. Connected components that do not satisfy the character constraints are removed to create an Image C. The connected components are pixels connected on the basis of pixel intensity and predefined distance between the pixels. The connected components can use a 4-connectivity algorithm or an 8-connectivity algorithm, or even a mixed algorithm, which uses 4-connectivity as well as 8-connectivity. Connectivity algorithms are applied to approximately determine the shape of the text present in the image.

A word-finding module 210 removes the potential text regions from the Image C that are not consistent with words to create an Image D. In particular, word-finding module 210 performs an image-closing operation on the Image C. The image closing operation is derived from operations of erosion and dilation. For example a gray-level closing operation consists of gray-level dilation of the image followed by gray-level erosion. The image closing operation is performed with the help of a structuring element. The structuring element consists of a pattern specified as the coordinates of a number of discrete points relative to an origin. For example, if Cartesian coordinates are used, the structuring element can be represented as an image on a rectangular grid. The result of the image closing operation is determined by the structuring element used. The image closing operation preserves background regions that have a shape similar to the structuring element, while eliminating all other regions of background pixels. The background pixels can be regions in the image that are not of interest or are not being considered as prime object in the image. The background pixels can be pixels with an intensity value of. 0. The word finding module 210 then checks to verify whether the properties of connected components created after the image-closing operation are consistent with the properties associated with the words by applying a series of predefined word constraints. For example, it checks whether the aspect ratio of the connected component falls within a certain range. Components that are not consistent with at least one of these predefined word constraints are removed to create the Image D. Output text-image-creation module 212 finds the connected components in the Image D and creates a bounding box for each connected component. The connected components computing algorithm finds regions of connected pixels on the basis of intensity value of the pixels and predefined special adjacency. A bounding box is the smallest rectangle enclosing a given connected component. The bounding boxes can be of different sizes depending on the size of the connected component or the text. The output text-image-creation module then intersects the Image A with a mask created from the union of all bounding boxes to create an OutputImage2, the, OutputImage2 comprising detected text regions. Any pixel in the Image A that is not within the bounding boxes is zeroed out while retaining the regions of the Image A within the bounding boxes to create OutputImage2. This module also extracts gray level image areas corresponding to the bounding boxes to form gray-level image chips. Each of the gray-level image chips is a new gray-level image comprising a region from the gray-level image corresponding to a single bounding box. Hence, the gray-level image chips are sub-parts of the gray-level image, wherein each of the gray-level image chips corresponds to a bounding box in Image D.

Figure 3:
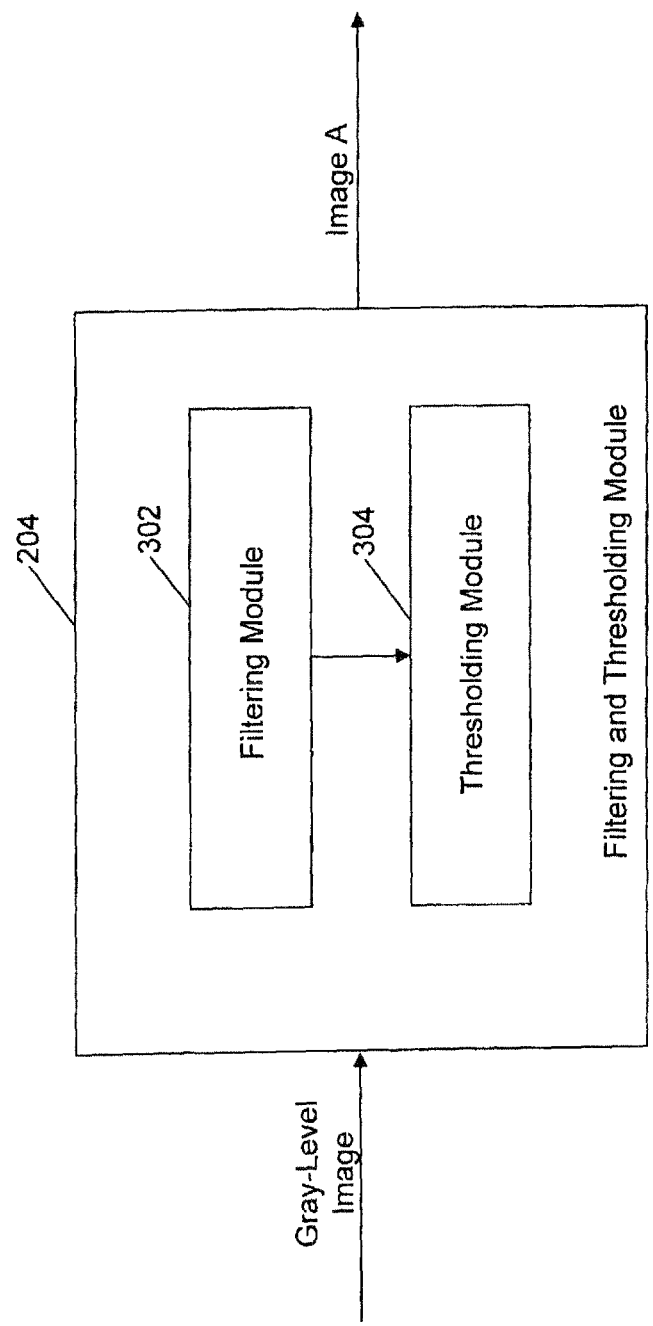
FIG. 3 is a block diagram illustrating a filtering and thresholding module, along with its elements, in accordance with an embodiment of the present invention.

FIG. 3 is a block diagram illustrating filtering and thresholding module 204, along with its elements, in accordance with an embodiment of the present invention. Filtering and thresholding module 204 includes a filtering module 302 and a thresholding module 304. Filtering module 302 filters the gray-level image to emphasize line-like and bar-like regions, which potentially correspond to text, in the gray-level image. The filter responds to text regions as well as some non-text entities such as lines, intersecting lines, rectangles and boxes. Filtering module 302 works even if there are some blur or brightness variations in the gray-level image.

In accordance with an embodiment of the present invention, filtering module 302 uses a Laplacian-of-Gaussian (LOG) filter, which responds strongly to line-like and oar-like entities. The response of the LOG filter depends on the relative contrast across the line-like and bar-like regions and hence is not susceptible to illumination variations. This is because illumination variations involve gradual changes in light intensity which are removed by the smoothening action of the Gaussian filter of the LOG filter. In the smoothening action, sharp edges of the image are blurred. Blur causes lines and bars to be diffused. The LOG filter has a local support region, which is a function of the standard deviation of the LOG filter. An appropriate adjustment of the standard deviation makes the local support region large enough to take into account the averaged response over the diffused bar. Small noise regions are also created by the LOG filter. However, their local support is usually very small, and hence the response for most noise regions is small. Thresholding module 304 then eliminates many of these noisy regions but tends to preserve strong bar-like regions. Examples of a thresholding algorithm include, but are not limited to, an adaptive thresholding algorithm and a constant thresholding algorithm.

Figure 4:
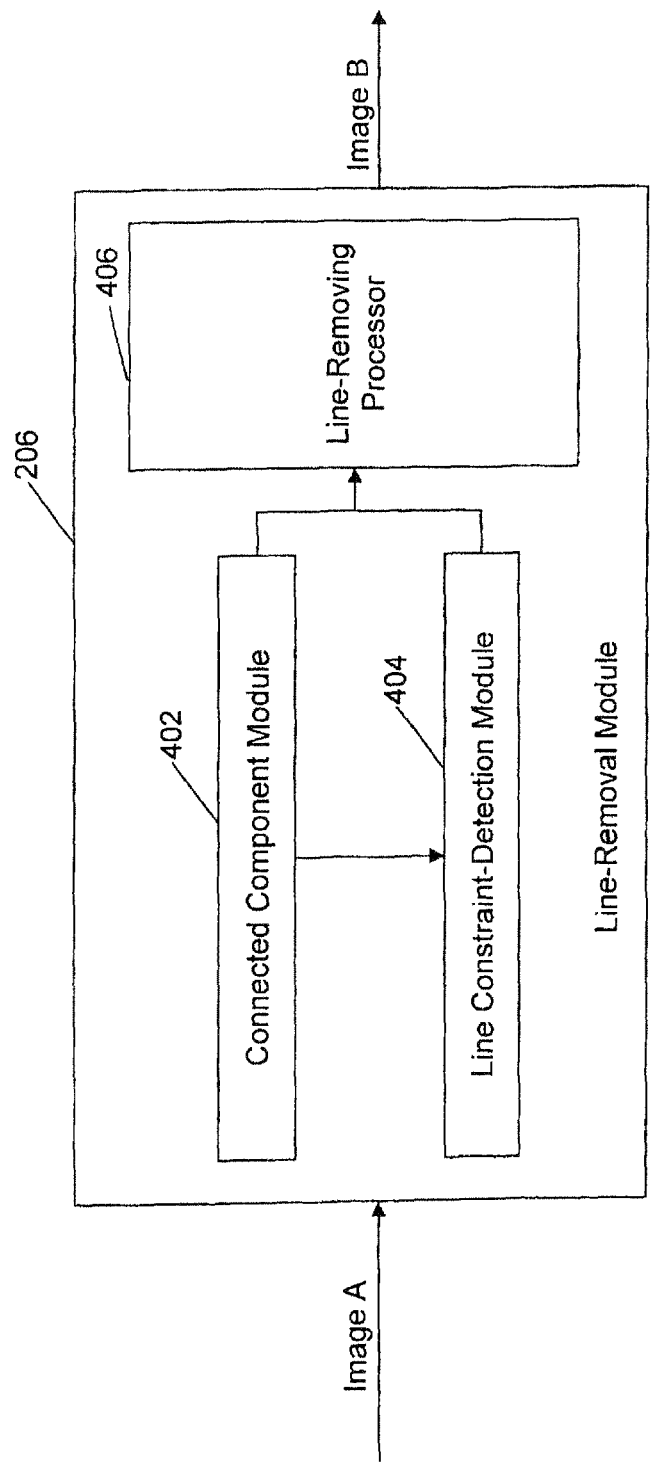
FIG. 4 is a block diagram illustrating a line-removal module along with its elements, in accordance with an embodiment of the present invention.

FIG. 4 is a block diagram illustrating line-removal module 206, along with its elements, in accordance with an embodiment of the present invention. Line-removal module 206 first computes connected components in the Image A, using connected component module 402. A connected components computing algorithm finds regions of connected pixels on the basis of intensity value of the pixels and predefined distance between the pixels. The connected components that correspond to long straight lines, bars, rectangles and other non-text regions are removed. Usually, entities such as lines and bars are much longer when compared to text. However, these lines and bars may not be as thick as the text. An estimate of the thickness may be obtained by looking at the maximum distance transformed for the connected component. The maximum distance transformed for the connected component can be the maximum dimension for the bounding box of the connected component. For components such as lines, which have smaller widths when compared to their length, the perimeter of the connected component gives a good estimate of their length.

Therefore, in accordance with an embodiment of the present invention, a line constraint-detection module 404 computes the ratio of the perimeter to the maximum distance transformed for a connected component. The maximum distance transformed for the connected component can be the maximum dimension for the bounding box of the connected component. The maximum distance transformed finds the thickness of the connected component. If the ratio is larger than a threshold, the connected component is removed by line-removing processor 406. The threshold is determined empirically. The remaining connected components form the Image B.

Figure 5:
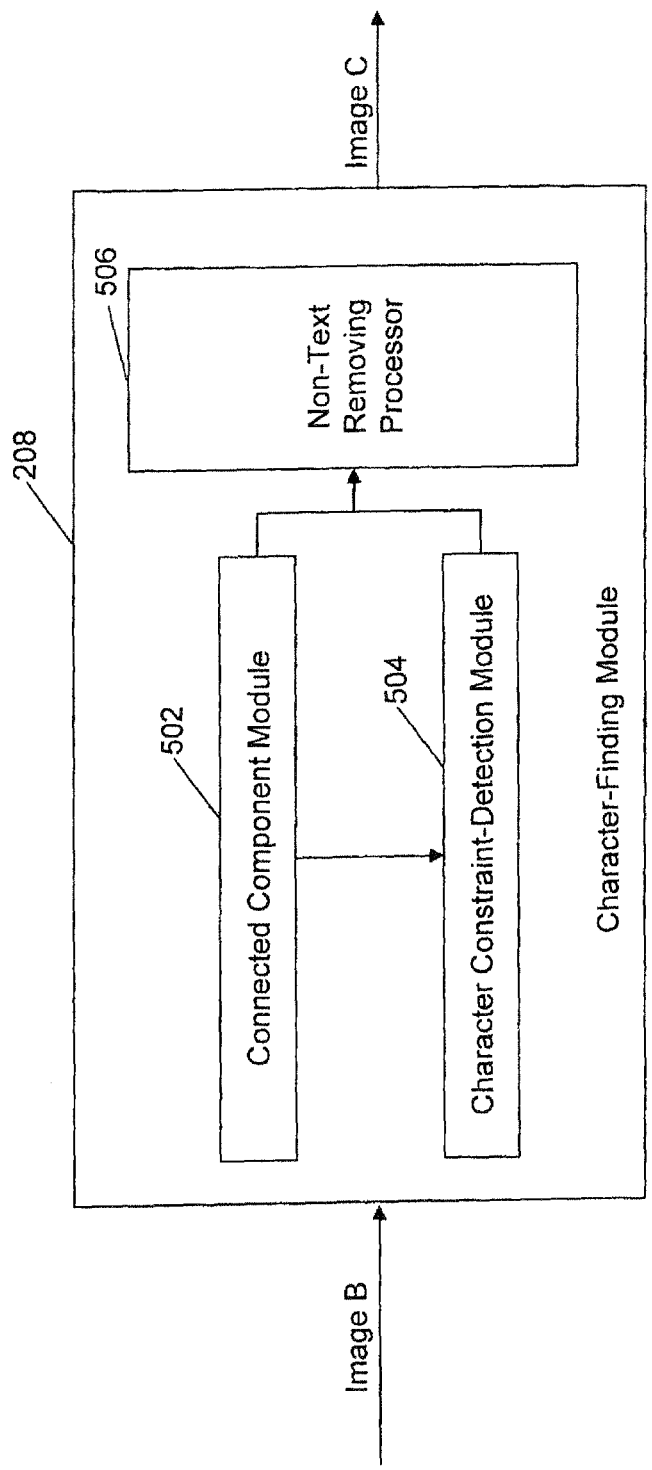
FIG. 5 is a block diagram illustrating a character-finding module along with its elements, in accordance with an embodiment of the present invention.

FIG. 5 is a block diagram illustrating character-finding module 208, along with its elements, in accordance with an embodiment of the present invention. Character-finding module 208 first computes connected components in the Image B using connected component module 502. The connected components computing algorithm finds regions of connected pixels on the basis of intensity value of the pixels and predefined special adjacency. Character-finding module 208 then uses, character constraints to decide if the connected component is a part of a character or not. If not, then the connected component is removed.

In accordance with an embodiment of the present invention, it is assumed that characters must be close to and similar to other nearby characters with which they form a word. In one such embodiment of the present invention, character constraint-detection module 504 decides, on the basis of predefined character constraints, if the connected component is a part of the character or not. This is performed by checking whether the centroids of adjacent connected components are approximately along the same line, whether the height and width of the adjacent characters fall within a specified range of ratios among them, and whether the spacing between characters is almost similar. The parameters used for making these decisions are determined empirically. Additionally, to allow for the breaking up of a character into two or more connected components, an additional check is made to determine the multiple components that can be treated as a single unit to satisfy the above constraints. Components that do not satisfy at least one of the character constraints are removed by non-text removing processor 506 from potential text regions in the Image B, to create the Image C.

Figure 6:
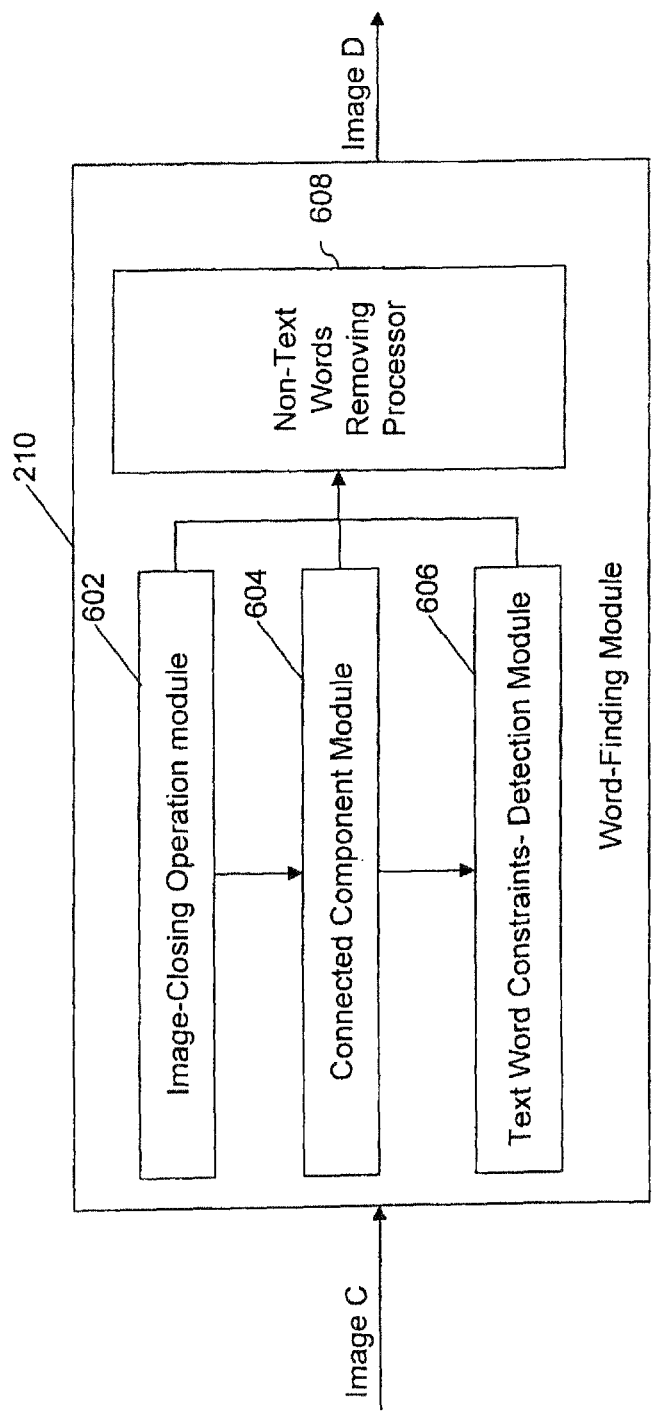
FIG. 6 is a block diagram illustrating a word-finding module along with its elements, in accordance with an embodiment of the present invention.

FIG. 6 is a block diagram illustrating word-finding module 210, along with its elements, in accordance with an embodiment of the present invention. Word-finding module 210 removes from the Image C the potential text region, not consistent with words, to create the Image D. Word-finding module 210 first performs an image-closing operation using image-closing operation module 602 on the Image C to connect characters that are likely to be part of the same word. The image closing operation is derived from operations of erosion and dilation. For example gray-level closing consists of gray-level dilation followed by gray-level erosion. The image closing operation is performed with the help of a structuring element. The structuring element consists of a pattern specified as the coordinates of a number of discrete points relative to an origin. For example, if Cartesian coordinates are used, the structuring element can be represented as an image on a rectangular grid. The result of the image closing operation is determined by the structuring element used. The image closing operation preserves background regions that have a shape similar to the structuring element, while eliminating all other regions of background pixels. The background pixels are regions in the image that are not of interest or are not being considered as prime object in the image. The background pixels can be pixels with an intensity value of 0. A predefined structuring element for the image-closing operation is chosen so that it connects components corresponding to characters into words. The predefined structuring element connects components even if there are some characters that have not been found through previous steps. Connected component module 604 then computes the connected components. The connected components computing algorithm finds regions of connected pixels on the basis of intensity value of the pixels and predefined special adjacency. Thereafter, text word constraints-detection module 606 checks if the connected components satisfy at least one of the predefined word constraints.

In accordance with an embodiment of the present invention, these predefined word constraints may include the aspect ratio, height and width of the bounding box of the connected component in a prescribed range, and the number of pixels in the connected component divided by the width and height of the bounding box of the connected component within a prescribed range. The bounding box for a connected component is the smallest rectangle enclosing the connected component. The bounding boxes can be of different sizes depending on the size of the connected component or the text. The prescribed ranges are determined empirically. Any connected components that do not satisfy at least one of these predefined word constraints are removed from the Image C to create the Image D. Therefore, the Image D contains a set of connected components that are likely to correspond to words.

Figure 7:
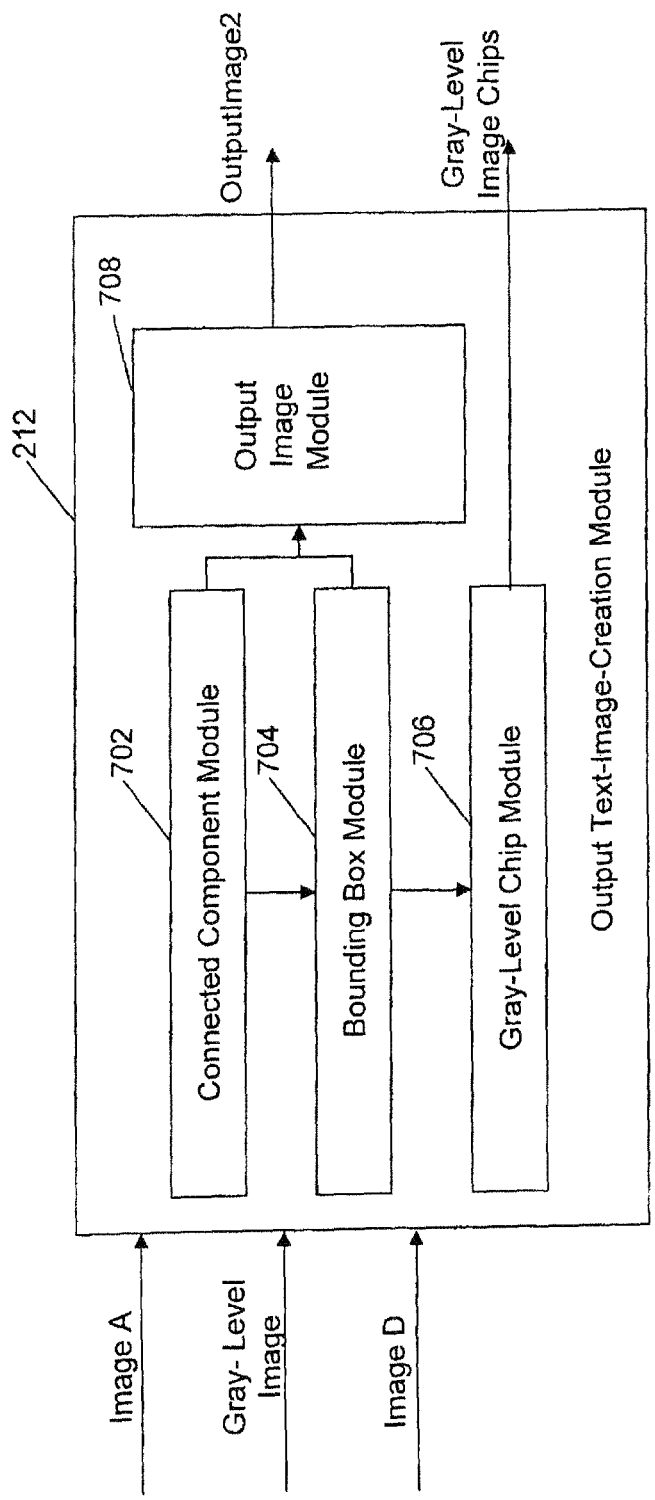
FIG. 7 is a block diagram illustrating an output text-image-creation module along with its elements, in accordance with an embodiment of the present invention.

FIG. 7 is a block diagram illustrating output text-image-creation module 212, along with its elements, in accordance with an embodiment of the present invention. Output text-image-creation module 212 finds connected components in the Image D using a connected component module 702. A Bounding box module 704 then finds the bounding boxes for the connected components in the Image D. A bounding box is the smallest rectangle enclosing a given connected component. Further, output text-image-creation module 212 uses output image module 708 to compute the intersection of the Image A and the union of the bounding boxes from the Image D, to create the OutputImage2. Any pixel in the Image A that is not within the bounding boxes is zeroed out by output image module 708, while retaining the regions of the Image A within the bounding boxes, to create OutputImage2. The OutputImage2 is a binary image containing detected text regions. Further, the OutputImage2 includes regions of the Image A corresponding to the bounding boxes. The OutputImage2 is passed to optical character-recognizer module 108 for recognition. In addition, for each bounding box, the corresponding image area from the gray-level image is extracted by gray level chip module 706 to form gray-level image chips. Each chip corresponds to one bounding box.

Figure 8:
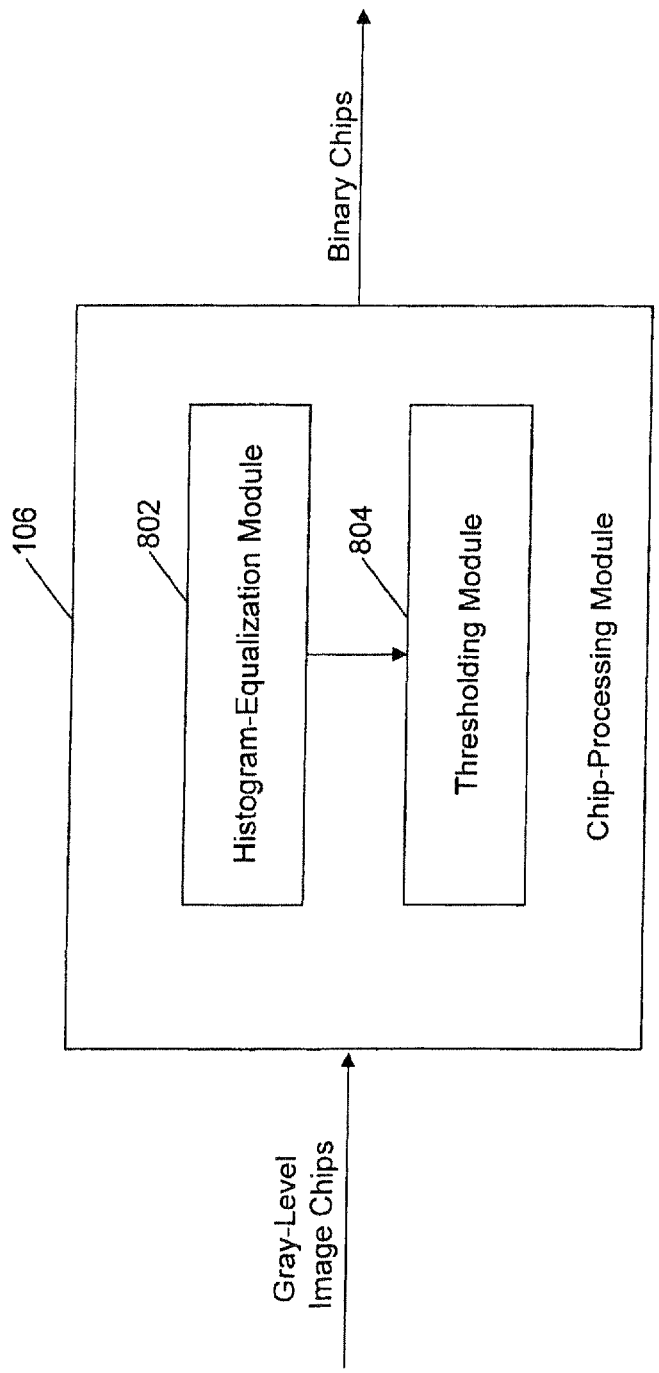
FIG. 8 is a block diagram illustrating a chip-processing module in accordance with an embodiment of the present invention.

FIG. 8 is a block diagram illustrating chip-processing module 106, along with its elements, in accordance with an embodiment of the present invention. Chip-processing module 106 processes gray-level image chips to form binary chips. Each of the gray-level image chips has a histogram of pixel intensity values and hence a cumulative density function for the pixel intensity values associated with it. Chip-processing module 106 includes a histogram-equalization module 802, which equalizes the histogram of each gray-level image chip received from output text-image-creation module 212. Histogram-equalization redistributes the histogram by spreading out the most frequent intensity values in the histogram and hence flattening the cumulative density function for each of the gray-level image chips. Since the density of text pixels is small when compared to that of background pixels, this flattening causes the text pixels and the blurred text pixels, which are close in intensity to the text pixels, to be placed in the same histogram bin after flattening. Thus the text pixels and the blurred text pixels are essentially forced into the same intensity bin. The histogram-equalized chips are then thresholded by using thresholding module 804 to create the binary chips, which are passed through the optical character-recognizer module 108 for recognition.

Figure 9:
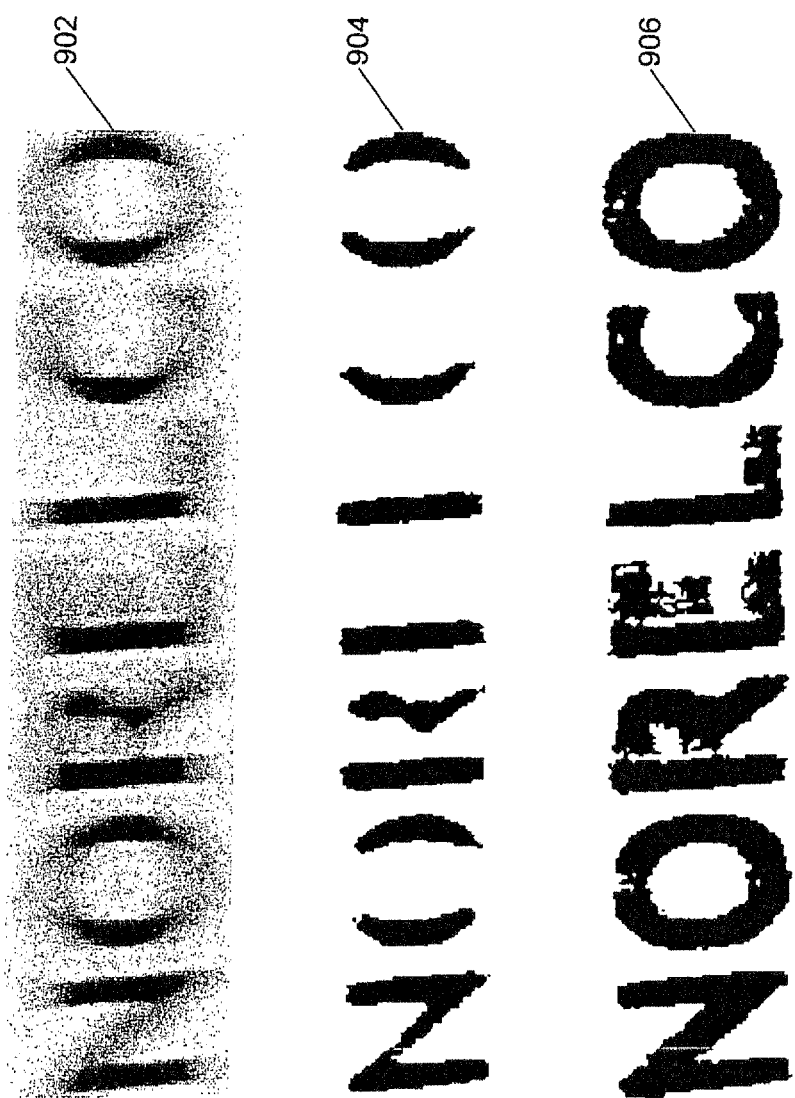
FIG. 9 shows multiple versions of an exemplary image, in accordance with an embodiment of the present invention.
Figure 10:
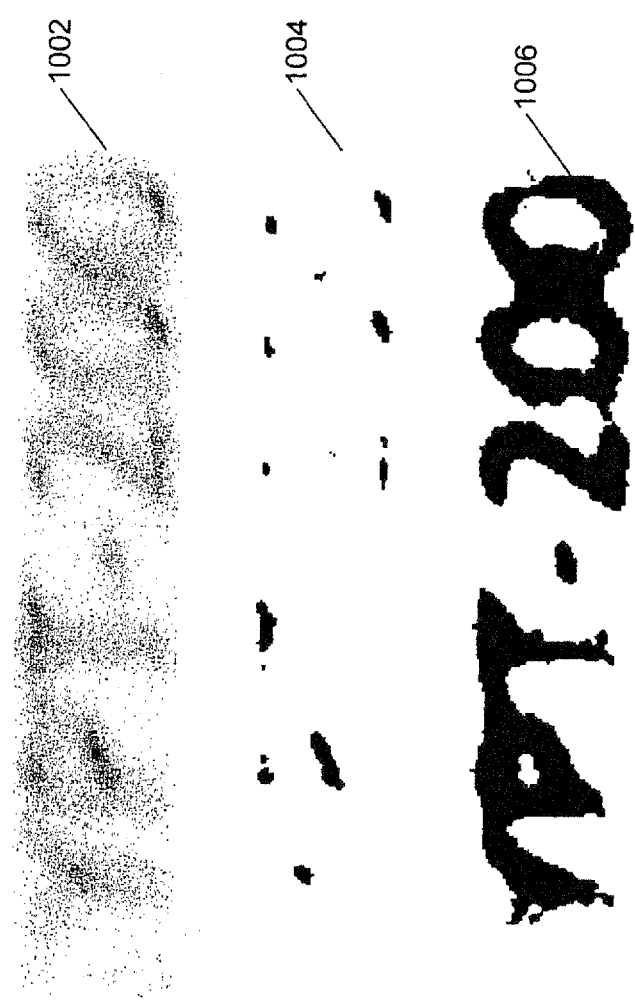
FIG. 10 shows multiple versions of another exemplary image, in accordance with an embodiment of the present invention.

Each gray-level image chip contains text as illustrated by 902 in FIGS. 9 and 1002 in FIG. 10. As mentioned in the forgoing discussion, the text may be blurred. Thresholding of the blurred text produces images 904 in FIGS. 9 and 1004 in FIG. 10. As can be seen from both the examples, the blur reduces contrast, and hence many portions of the characters are missed. Images 906 in FIGS. 9 and 1006 in FIG. 10 show that by histogram-equalization followed by thresholding, the characters can be properly recovered. The rationale for the histogram-equalization is as follows: Blurred text regions in the image have an intensity value that falls between the intensity value of the text and that of the background. However, the intensity value of the blurred text region is closer to the intensity value of the text. The image has a histogram of pixel intensity values and hence a cumulative density function for the pixel intensity values associated with it. Histogram-equalization redistributes the histogram by spreading out the most frequent intensity values in the histogram and hence flattens the cumulative density function for the image. Since the density of text pixels is small when compared to that of background pixels, this flattening causes the text pixels and the blurred text pixels, which are close in intensity to the text pixels, to be placed in the same histogram bin after flattening. Thus the text pixels and the blurred text pixels are essentially forced into the same intensity bin (up to the resolution of the histogram). Thresholding removes noise and emphasizes the text against the background. This procedure is efficient for a single word but does not work with a large image with many words since in the latter case the text pixels and the background may vary widely in intensity. Hence, it is advisable to perform histogram equalization on the gray-level image chips rather than on the gray-level image.

Figure 11:
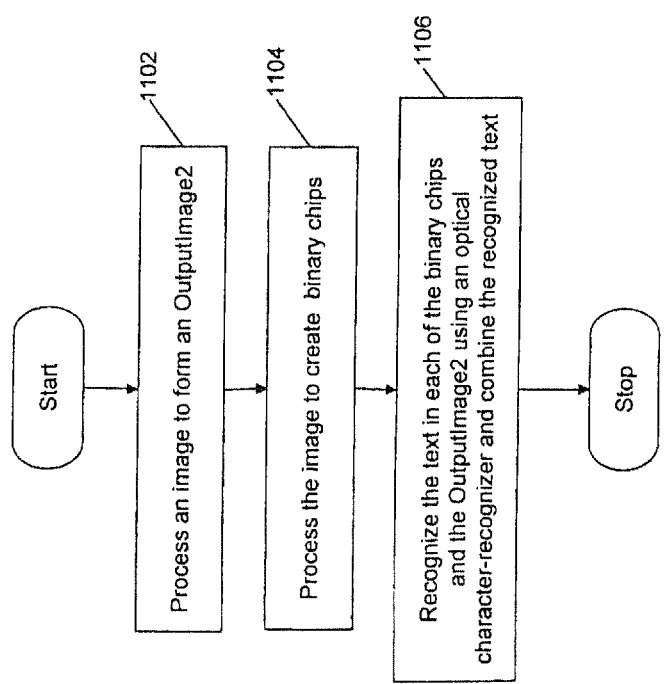
FIG. 11 illustrates the steps for detecting and recognizing text in an image, in accordance with an embodiment of the present invention.

FIG. 11 illustrates the steps for detecting and recognizing text in an image, in accordance with an embodiment of the present invention. At step 1102, the image is processed to form an OutputImage2. The OutputImage2 is a binary image comprising detected text regions. At step 1104, the image is processed to create binary chips. Each of the binary chips comprises one detected text region. At step 1106, the text is recognized in each of the binary chips and in the OutputImage2 using an optical character recognizer, and the recognized texts are then combined together to give the final result. These steps are explained in greater detail in conjunction with FIGS. 12A and 12B.

Figure 12A:
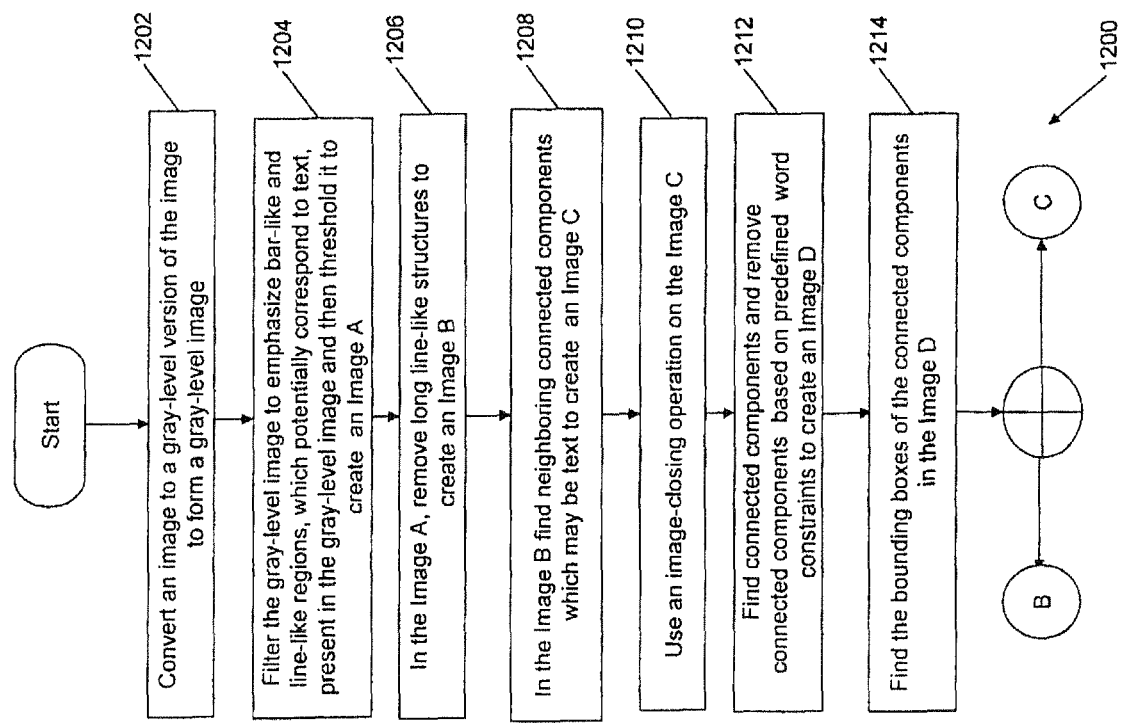

FIGS. 12A and 12B show a flowchart 1200 illustrating the steps for detecting and recognizing text in an image, in accordance with another embodiment of the present invention. At step 1202, the image is converted to a gray level version of the image by gray-level conversion module 202 to form a gray-level image. The gray-level image is composed of shades of gray, varying from black at the weakest intensity to white at the strongest. At step 1204, the gray-level image is filtered by filtering and thresholding module 204 to emphasize bar-like and line-like regions, which potentially correspond to text, present in the gray-level image. The filters respond to text regions as well as some non-text regions such as lines and boxes. This step can be performed by convolving the image with a filter such as a LOG filter. The convolution of the image with the LOG filter includes superimposition of the LOG filter mask over the image pixels. The filtered gray-level image is then thresholded by thresholding module 304 to form an Image A.

At step 1206, line-removal module 206 removes long line structures to create an Image B. The long line structures comprise long straight lines and rectangles. This can be based on a predefined ratio of the perimeter to the maximum distance transformed for a connected component. For example, line-removal module 206 first computes connected components in the Image A using connected component module 402. A connected components computing algorithm finds regions of connected pixels on the basis of intensity value of the pixels and predefined special adjacency. The line removal module 206 then uses line constraint-detection module 404 to check whether the connected components satisfy certain constraints. If the constraints show that the components are more likely to be long straight lines or rectangles, then they are removed by line-removing processor 406 to create an Image B. The long straight lines and rectangles are assumed not to correspond to text. At step 1208, character-finding module 208 removes connected components in the image B that are not likely to be characters to identify potential text regions in the Image B. It first finds connected components in the Image B using connected component module 502, then checks whether the connected components satisfy at least one character constraint, based on the properties of the neighboring text, and whether they are likely to be characters using character constraint-detection module 504. It is assumed that the neighboring text characters share certain properties; the spacing between such characters is roughly constant, and they are approximately aligned vertically. Components that do not satisfy at least one of the constraints are removed from the Image B by non-text removing processor 506 to create an Image C.

At step 1210, word-finding module 210 performs an image-closing operation on the Image C using image-closing operation module 602. At step 1212, word-finding module 210 finds connected components using connected component module 604 and then checks whether the resulting components satisfy certain predefined word constraints using text word constraint-detection module 606. Components that do not satisfy at least one of the predefined word constraints are removed by non-text words removing processor 608 to create an Image D. Thus, non-text removing processor 608 removes the potential text region not consistent with words from the Image C to create the Image D.

At step 1214, output text-image-creation module 212 finds the bounding boxes for the connected components in the Image D, using bounding box module 704. Bounding boxes are the smallest rectangles enclosing a connected component. At step 1216, output text-image-creation module 212 uses output image module 708 to compute the intersection of the Image A and the union of the bounding boxes from the Image D to create an OutputImage2, the OutputImage2 comprising detected text regions. Any pixel in the Image A that is not within the bounding boxes is zeroed out while retaining the regions of the Image A within the bounding boxes to create Output Image2. At step 1218, gray-level image chips are also created by extracting, for each bounding box, the corresponding image area from, the gray-level image to create gray-level image chips. At step 1220, each of the gray-level image chips is processed to create binary chips. In the step of processing, each of the gray-level image chips is first histogram-equalized using histogram-equalization module 802 and then thresholded using thresholding module 804 to create binary chips.

At step 1222, the text in the OutputImage2 and the binary chips is recognized. This is done by transforming the OutputImage2 and the binary chips into the electronic representation of their text by optical character-recognizes module 108. At step 1224, the electronic representations of text for the binary chips and the OutputImage2 are combined into a single output, wherein the single output is detected text. Possible ways of combination include either taking a majority vote or taking the logical OR of the text outputs.

Various embodiments of the present invention provide a method, system and computer program product for detecting and recognizing a text in an image with lighting variations. The image is captured by a computational device with a camera, such that the camera is not fronto-parallel to the text. This results in lighting variations in the image, which makes detection of the text in the image difficult and reduces the accuracy of the text. This method detects text in such images by improving the quality of the images by using various image-processing techniques.

Further, various embodiments of the present invention provide a method, system and computer program product for detecting and recognizing text in highly blurred images. This process is performed by decreasing the blurriness of these images by performing various image-processing techniques.

Furthermore, various embodiments of the present invention provide a method, system and computer program product for recognizing text, not only in camera phone images, but also from other cameras and scanners.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, a display unit and the Internet. The computer comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and so forth. The storage device can also be other similar means for loading computer programs or other instructions on the computer system.

The computer system executes a set of instructions that are stored in at least one storage elements, to process input data. The storage elements may also hold data or other information, as desired, and may be an information source or physical memory element present in the processing machine.

The set of instructions may include various commands that instruct the processing machine to execute specific tasks such as the steps constituting the method of the present invention. The set of instructions may be in the form of a software program. The software may be in various forms such as system software or application software. Further, the software may be in the form of a collection of separate programs, a program module with a larger program, or a portion of a program module. The software may also include modular programming in the form of object-oriented programming. Processing of input data by the processing machine may be in response to user commands, to the results of previous processing, or to a request made by another processing machine.

While the embodiments of the invention have been discussed and described, the invention is not limited to these embodiments only. A number of changes and modifications can be thought of, without moving away from the scope of the invention, as discussed in the claims.

What is claimed is:

1. A computer-implemented method, comprising:
under the control of one or more computer systems configured with executable instructions,
receiving an input image that includes at least one image variation;
filtering and segmenting the input image;
selecting regions within the filtered and segmented input image having connected components;
creating a mask corresponding to the regions of connected components, the mask including bounding boxes that at least partially enclose corresponding regions of the connected components;
intersecting the filtered and segmented input image with the mask to produce a first output image;
separately processing the filtered and segmented input image corresponding to the mask to create a binary output image;
separately recognizing text in the first output image and in the binaryoutput image using an optical character recognizer; and
combining the separately recognized text from the first output image and from the binary output image to produce a single output.

2. The computer-implemented method of claim 1, further comprising:
separately processing the input image to produce a third output image using a different processing technique than used to produce the first output image and the second output image, the recognized text from the first output image, the second output image, and the third output image being combined using a majority vote process to select portions from the first output image, the second output image, and the third output image.

3. The computer-implemented method of claim 1, wherein combining the separately recognized text from the first output image and the second output image comprises taking a logical OR of the first output image and the second output image.

4. The computer-implemented method of claim 1, wherein the at least one image variation includes at least one of noise, blur, or a lighting variation.

5. The computer-implemented method of claim 1, wherein selecting regions having the connected components includes identifying regions of connected pixels based on an intensity value of the pixels and a distance between the pixels.

6. The computer-implemented method of claim 5, wherein separately recognizing the text in the first output image and in the binary output image is based upon whether pixel values for pixels are above or below a threshold value.

7. The computer-implemented method of claim 1, wherein the bounding boxes are rectangular in shape.

8. A computing system, comprising:
a processor; and
a memory including instructions that, when executed by the processor, cause the computing system to:
receive an input image that includes at least one image variation;
filter and segmenting the input image;
select regions within the filtered and segmented input image having connected components;
create a mask corresponding to the regions of connected components, the mask including bounding boxes that at least partially enclose corresponding regions of the connected components;
intersect the filtered and segmented input image with the mask to produce a first output image;
separately process the filtered and segmented input image corresponding to the mask to create a binary output image;
separately recognize text in the first output image and in the binary output image using an optical character recognizer; and
combine the separately recognized text from the first output image and from the binary output image to produce a single output.

9. The computing system of claim 8, wherein the instructions, when executed by the processor, further cause the computing system to:
separately process the input image to produce a third output image using a different processing technique than is used to produce the first output image and the second output image, the recognized text from the first output image, the second output image, and the third output image being combined using a majority vote process to select portions from the first output image, the second output image, and the third output image.

10. The computing system of claim 8, wherein the instructions, when executed by the processor, further cause the computing system to combine the separately recognized text from the first output image and the second output image by taking a logical OR of the first output image and the second output image.

11. The computing system of claim 8, wherein the at least one image variation includes at least one of noise, blur, or a lighting variation.

12. The computing system of claim 8, wherein the instructions, when executed by the processor, further cause the computing system to select regions having the connected components by identifying regions of connected pixels based on an intensity value of the pixels and a distance between the pixels.

13. The computing system of claim 8, wherein the instructions, when executed by the processor, further cause the computing system to separately recognize the text in the first output image and in the binary output image based upon whether pixel values for pixels are above or below a threshold value.

14. The computing system of claim 8, wherein the bounding boxes are rectangular in shape.

15. A non-transitory computer-readable storage medium storing instructions that, when executed by a processor, cause the processor to:

receive an input image that includes at least one image variation;

filter and segmenting the input image;

select regions within the filtered and segmented input image having connected components;

create a mask corresponding to the regions of connected components, the mask including bounding boxes that at least partially enclose corresponding regions of the connected components;

intersect the filtered and segmented input image with the mask to produce a first output image;

separately process the filtered and segmented input image corresponding to the mask to create a binary output image;

separately recognize text in the first output image and in the binary output image using an optical character recognizer; and combine the separately recognized text from the first output image and from the binary output image to produce a single output.

16. The non-transitory computer-readable storage medium of claim 15, wherein the instructions, when executed by the processor, further cause the processor to:

separately process the input image to produce a third output image using a different processing technique than is used to produce the first output image and the second output image, the recognized text from the first output image, the second output image, and the third output image being combined using a majority vote process to select portions from the first output image, the second output image, and the third output image.

17. The non-transitory computer-readable storage medium of claim 15, wherein the instructions, when executed by the processor, further cause the processor to combine the separately recognized text from the first output image and the second output image by taking a logical OR of the first output image and the second output image.

18. The non-transitory computer-readable storage medium of claim 15, wherein the at least one image variation includes at least one of noise, blur, or a lighting variation.

19. The non-transitory computer-readable storage medium of claim 15, wherein the instructions, when executed by the processor, further cause the processor to select regions having the connected components by identifying regions of connected pixels based on an intensity value of the pixels and a distance between the pixels.

20. The non-transitory computer-readable storage medium of claim 15, wherein the instructions, when executed by the processor, further cause the processor to separately recognize the text in the first output image and in the binary output image based upon whether pixel values for pixels are above or below a threshold value.

* * * * *